(12) United States Patent
Lee

(10) Patent No.: US 8,789,648 B2
(45) Date of Patent: Jul. 29, 2014

(54) BELT TYPE DRIVELINE AND RACK ASSIST TYPE ELECTRIC POWER STEERING APPARATUS HAVING THE SAME

(75) Inventor: Je Ho Lee, Wonju-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/601,556

(22) Filed: Aug. 31, 2012

(65) Prior Publication Data
US 2013/0048411 A1 Feb. 28, 2013

(30) Foreign Application Priority Data
Aug. 31, 2011 (KR) .................. 10-2011-0087539

(51) Int. Cl.
*B62D 5/04* (2006.01)
*F16H 25/20* (2006.01)

(52) U.S. Cl.
CPC ............. *B62D 5/0448* (2013.01); *F16H 25/20* (2013.01)
USPC ........................................... 180/444; 474/94

(58) Field of Classification Search
USPC .............. 180/443, 444; 74/411, 443, 388 PS; 474/94
See application file for complete search history.

(56) References Cited

U.S. PATENT DOCUMENTS

| 2,615,316 | A | * | 10/1952 | Kirwin | 464/101 |
|---|---|---|---|---|---|
| 3,304,924 | A | * | 2/1967 | Dolza | 123/90.31 |
| 4,082,372 | A | * | 4/1978 | Kozuki | 305/199 |
| 4,619,156 | A | * | 10/1986 | Kiryu | 74/640 |
| 6,386,065 | B1 | * | 5/2002 | Hodjat | 74/574.4 |
| 2002/0148673 | A1 | * | 10/2002 | Menjak et al. | 180/444 |
| 2002/0165053 | A1 | * | 11/2002 | Kimura et al. | 474/70 |
| 2003/0192734 | A1 | * | 10/2003 | Bugosh | 180/444 |
| 2004/0007417 | A1 | * | 1/2004 | Lynn et al. | 180/444 |
| 2009/0191995 | A1 | * | 7/2009 | Hamada et al. | 474/94 |
| 2010/0099527 | A1 | * | 4/2010 | Rolando et al. | 474/94 |

* cited by examiner

*Primary Examiner* — Anne Marie Boehler
(74) *Attorney, Agent, or Firm* — McDermott Will & Emery LLP

(57) ABSTRACT

Disclosed are a belt type driveline and a rack assist type electric power steering apparatus including the belt type driveline, which improve power transmission efficiency and increases durability by preventing spinning with no traction of a ball nut and a nut pulley due to a slip between the ball nut and the nut pulley in an operation of a belt by a motor, and provide a user with convenient steering by minimizing vibration and noise transferred through a rack bar, the ball nut, the nut pulley, etc., when the rack bar slides while the nut pulley and the ball nut rotate.

5 Claims, 9 Drawing Sheets

BELT TYPE DRIVELINE AND RACK ASSIST TYPE ELECTRIC POWER STEERING APPARATUS HAVING THE SAME

BACKGROUND OF THE INVENTION

1. Field of the Invention

The present invention relates to a belt type driveline and a rack assist type electric power steering apparatus including the belt type driveline. More particularly, the present invention relates to a belt type driveline and a rack assist type electric power steering apparatus including the belt type driveline, which can increase durability while preventing spinning with no traction of a ball nut and a nut pulley due to a slip between the ball nut and the nut pulley in an operation of a driving belt by driving of a motor, and provide a user with convenient steering by minimizing vibration and noise transferred through a rack bar, the ball nut, the nut pulley, etc., when the rack bar slides while the nut pulley and the ball nut rotate.

2. Description the Prior Art

A general rack assist type electric power steering apparatus includes a steering system connected from a steering wheel to both-side wheels and an auxiliary power mechanism for supplying auxiliary steering power to the steering system.

FIG. 1 is a partial cross-sectional view schematically illustrating a general rack assist type electric power steering apparatus, and FIG. 2 is a cross-sectional view schematically illustrating a belt type driveline in the general rack assist type electric power steering apparatus.

The general rack assist type electric power steering apparatus includes a steering system 100 connected from a steering wheel 105 to both-side wheels 150 and an auxiliary power mechanism 160 for supplying auxiliary steering power to the steering system 100.

The steering system 100 includes a steering shaft 110 of which an upper end is connected to the steering wheel 105 to rotate together with the steering wheel 105 and of which a lower end is connected to a pinion shaft 120 through a pair of universal joints 115. Further, the pinion shaft 120 is connected to a rack bar 155 through a rack-pinion mechanism part 135, and both ends of the rack bar 155 are connected to wheels 150 through a tie rod 140 and a knuckle arm 145.

A pinion gear 125 formed in a lower end of the pinion shaft 120 is engaged with a rack gear 130 formed in one side of an outer peripheral surface of the rack bar 155, so that the rack-pinion mechanism part 135 is formed.

An auxiliary power mechanism 160 includes a torque sensor 117 for sensing steering torque applied to the steering wheel 105 by a driver and outputting an electrical signal proportionate to the sensed steering torque, an Electronic Control Unit (ECU) for generating a control signal based on the electrical signal transferred from the torque sensor 117, a motor 165 for generating auxiliary steering power based on the control signal transferred from the ECU, and a belt type driveline 170 for transferring the auxiliary power generated in the motor 165 to the rack bar 155 through a belt 210.

The belt type driveline 170 includes a motor 165 controlled by the ECU, a motor pulley 205a fixed to a shaft 165a of the motor 165, the belt 210 wound around the motor pulley 205a, a ball nut 220 for supporting the rack bar 155 within a rack housing 200 surrounding the rack bar 155, and a nut pulley 205b coupled to an outer peripheral surface of the ball nut 220.

The ball nut 220 rotates while being engaged with the rack bar 155 through a ball to make the rack bar 155 slide in an inner side of the rack housing 200. A bearing 240 for supporting rotation of the ball nut 220 is mounted in the outer peripheral surface of the ball nut 220.

However, according to the conventional art, the ball nut and the nut pulley spin with no traction due to the generation of a slip, so that efficiency of power transmission is deteriorated and the auxiliary steering power cannot be accurately transferred.

Further, there is a problem in that when the rack bar slides while the ball nut rotates, noise and vibration are generated through the rack bar, the ball nut, the nut pulley, the bearing, the rack housing, and the like, and the vibration and the noise are transferred to other components, thereby causing looseness of fastened components.

Further, the transferred noise and vibration are transferred to a driver together with vibration and noise of the other components, thereby deteriorating smooth steering of the driver.

SUMMARY OF THE INVENTION

Accordingly, the present invention has been made to solve the above-mentioned problems occurring in the prior art, and the present invention provides a belt type driveline and a rack assist type electric power steering apparatus including the belt type driveline, which can increase durability while preventing spinning with no traction of a ball nut and a nut pulley due to a slip between the ball nut and the nut pulley in an operation of a driving belt by a motor, and provide a user with convenient steering by minimizing vibration and noise transferred through a rack bar, the ball nut, the nut pulley, etc., when the rack bar slides while the nut pulley and the ball nut rotates.

In accordance with an aspect of the present invention, there is provided a belt type driveline including: a ball nut engaged with a rack bar and configured to slide the rack bar; a nut pulley engaged with an outer peripheral surface of the ball nut and configured to transfer a driving force of a belt; and support members formed in an inner peripheral surface of the nut pulley and configured to add a supporting force while being elastically transformed when the nut pulley is engaged with the ball nut.

In accordance with another aspect of the present invention, there is provided a rack assist type electric power steering apparatus, including: a torque sensor for outputting an electrical signal proportionate to steering torque; an Electronic Control Unit (ECU) for generating a control signal based on the electrical signal transferred torque sensor; a motor for generating auxiliary steering power based on the control signal transferred from the ECU; and a belt type driveline for transferring auxiliary power generated in the motor to a rack bar, wherein the belt type driveline includes: a ball nut engaged with the rack bar and configured to slide the rack bar; a nut pulley engaged with an outer peripheral surface of the ball nut and configured to transfer a driving force of a belt; and support members formed in an inner peripheral surface of the nut pulley and configured to add a supporting force while being elastically transformed when the nut pulley is engaged with the ball nut.

Accordingly, the present invention has an effect in increasing durability while preventing spinning with no traction of a ball nut and a nut pulley due to a slip between the ball nut and the nut pulley in an operation of a driving belt by driving of a motor, and providing a user with convenient steering by minimizing vibration and noise transferred through a rack bar, the ball nut, the nut pulley, etc., when the rack bar slides while the nut pulley and the ball nut rotates.

DETAILED DESCRIPTION OF THE EXEMPLARY EMBODIMENTS

Figure 1:
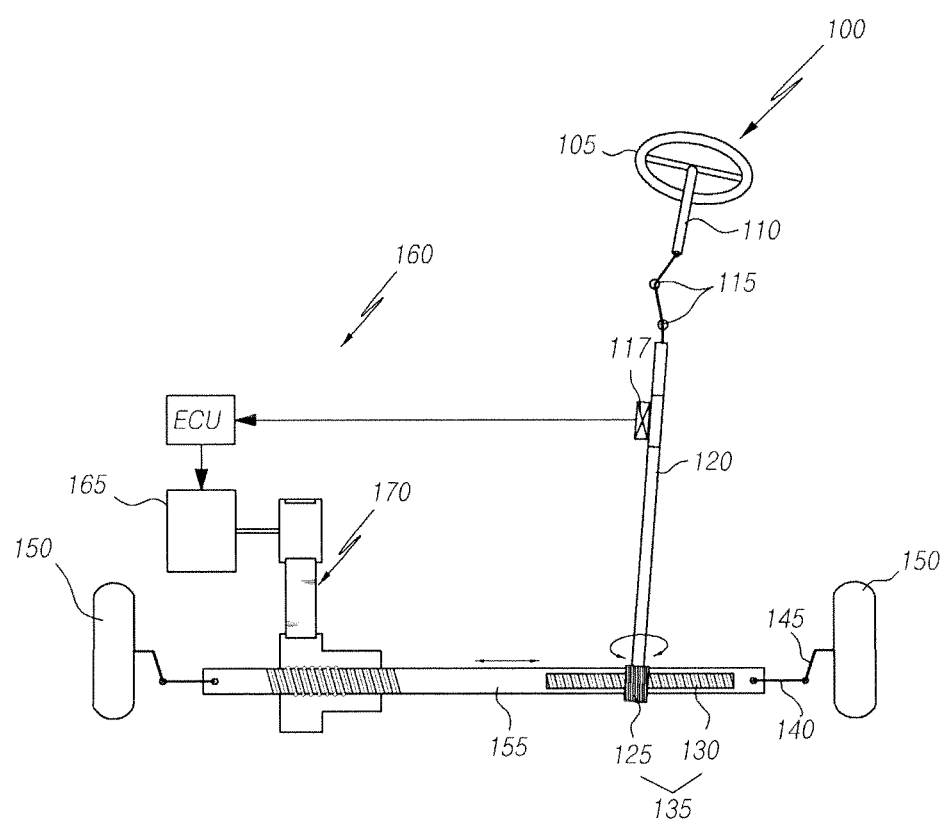
FIG. 1 is a partial cross-sectional view schematically illustrating a general rack assist type electric power steering apparatus.

Hereinafter, exemplary embodiments of the present invention will be described with reference to the accompanying drawings. In the following description, the same elements will be designated by the same reference numerals although they are shown in different drawings. Further, in the following description, a detailed explanation of known related functions and constitutions may be omitted so as to avoid unnecessarily obscuring the subject manner of the present invention.

Further, in describing the constructional elements of the present invention, the terms of a first, a second, A, B, (a), (b), or the like, can be used. Such a term is only for discriminating the constructional element from another constructional element, and does not limit the essential feature, order, or sequence of the constructional element, or the like. If one constructional element is "coupled to", "assembled with", or "connected to" another constructional element, one constructional element is directly coupled to or connected to another constructional element, but it can be understood as another different constructional element can be "coupled", "assembled", or "connected" between each constructional element.

Figure 3:
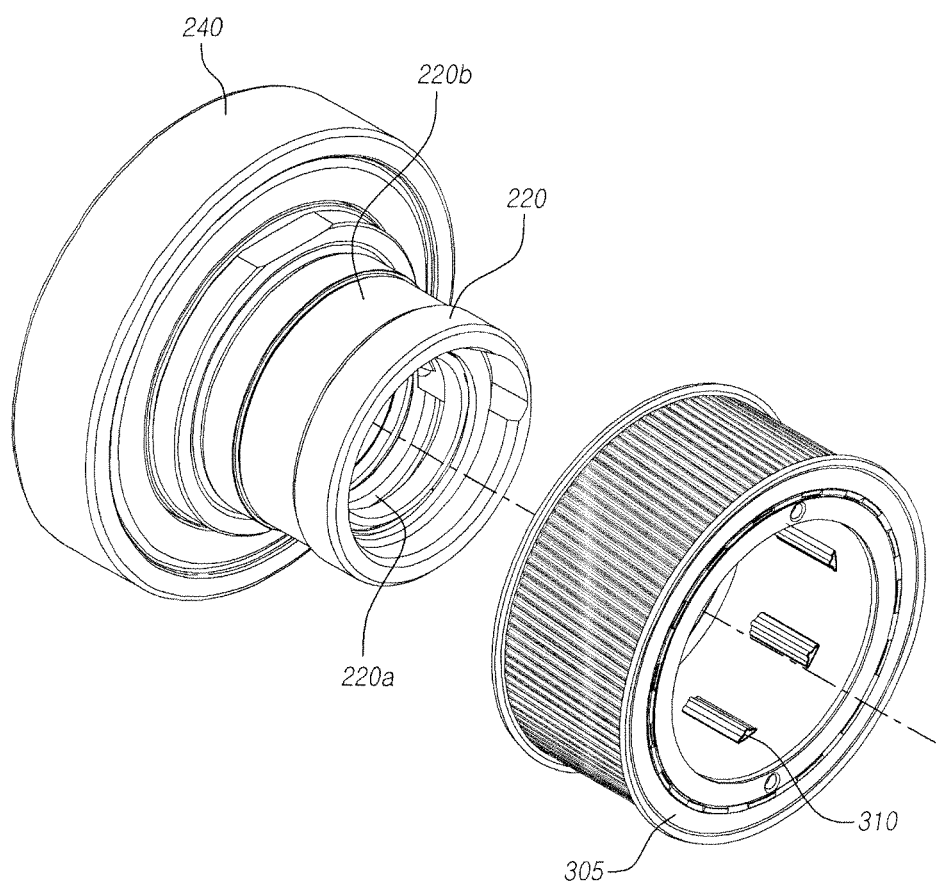
FIG. 3 is an exploded perspective view illustrating a part of a belt driveline according to a first embodiment of the present invention.
Figure 4:
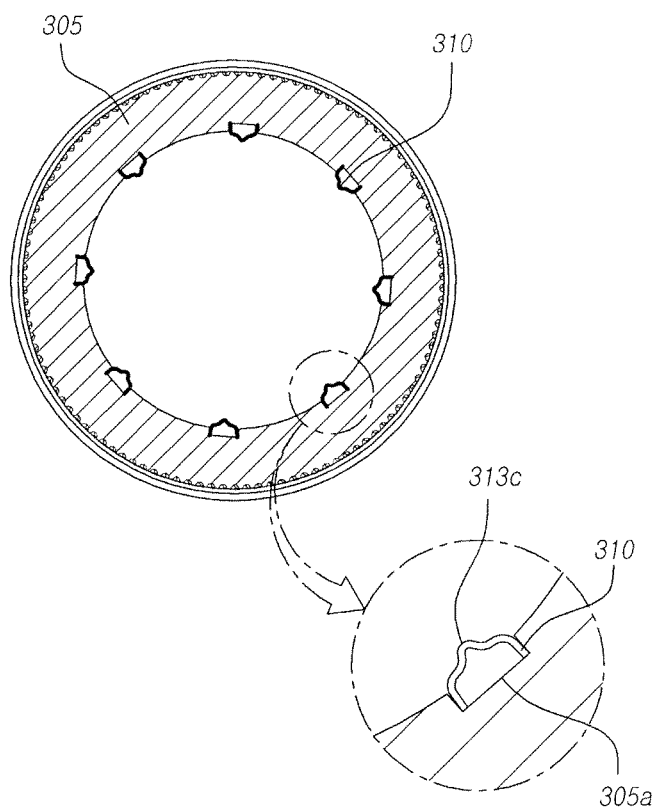
FIGS. 4 and 5 are front views illustrating a nut pulley in a belt driveline according to a first embodiment of the present invention.
Figure 5:
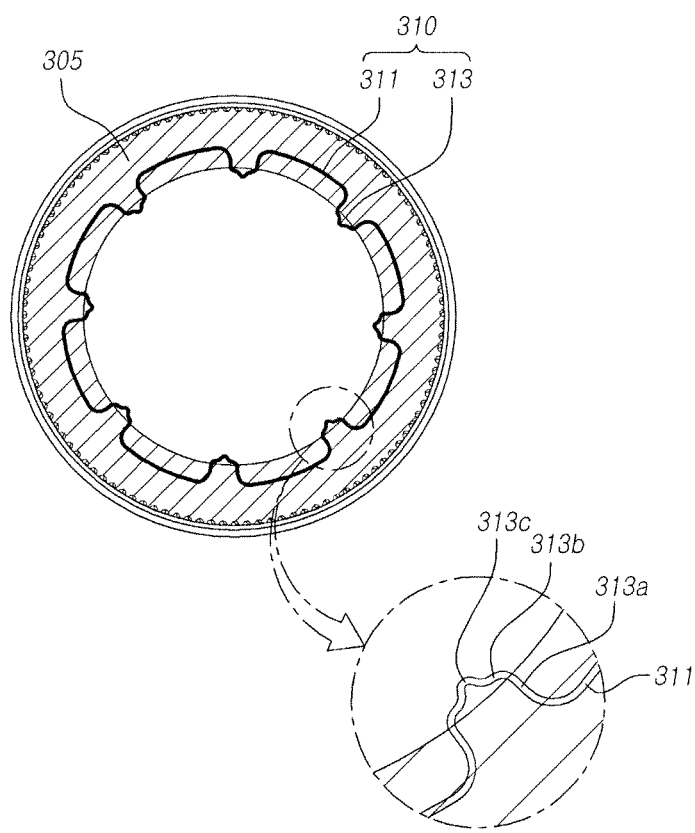
Figure 6:
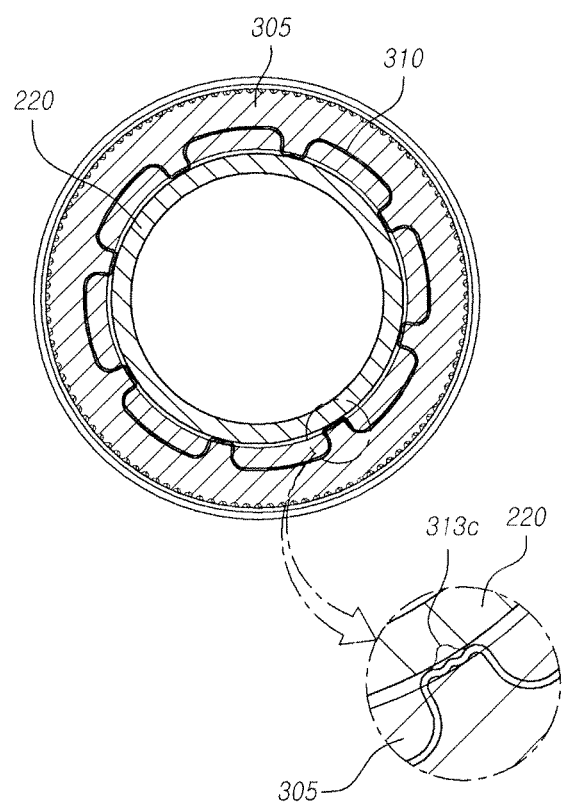
FIG. 6 is a front view illustrating a coupling state of a nut pulley and a ball nut in a belt driveline according to a first embodiment of the present invention.
Figure 7:
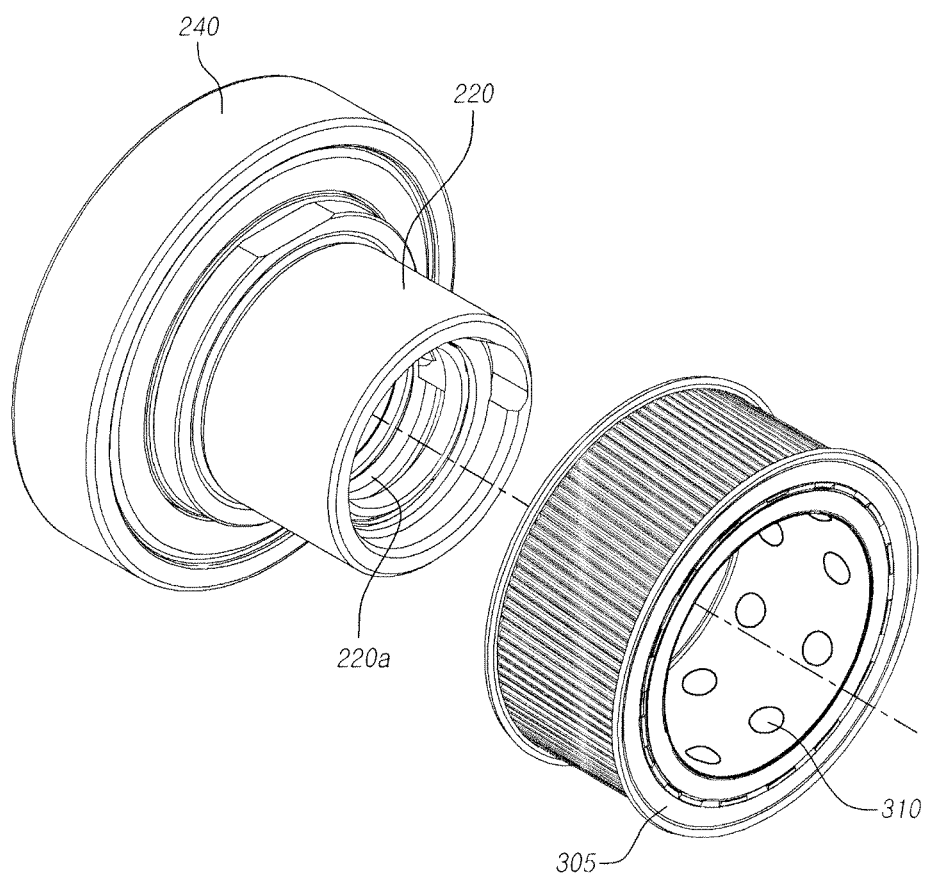
FIG. 7 is an exploded perspective view illustrating a part of a belt driveline according to a second embodiment of the present invention.
Figure 8:
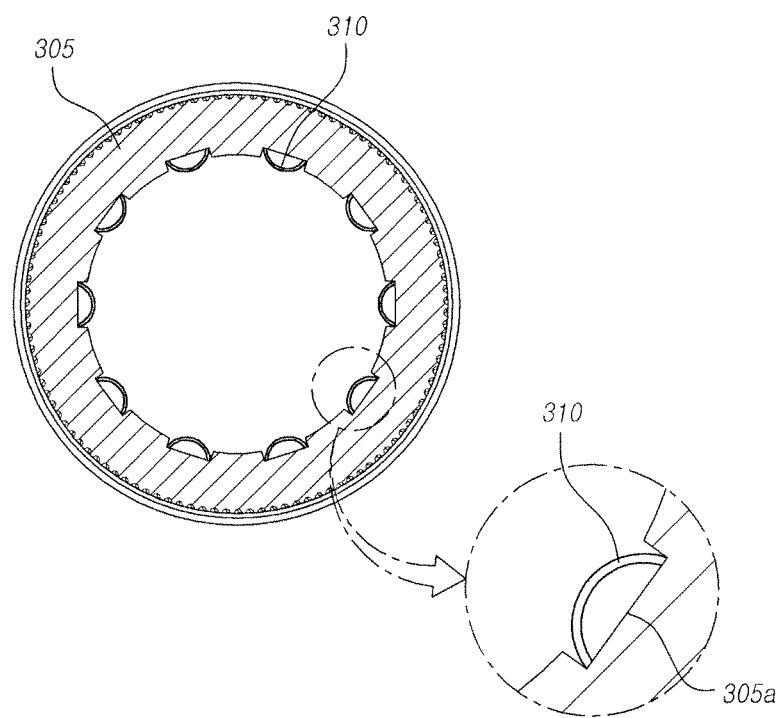
FIGS. 8 and 9 are front views illustrating a nut pulley in a belt driveline according to a second embodiment of the present invention.
Figure 9:
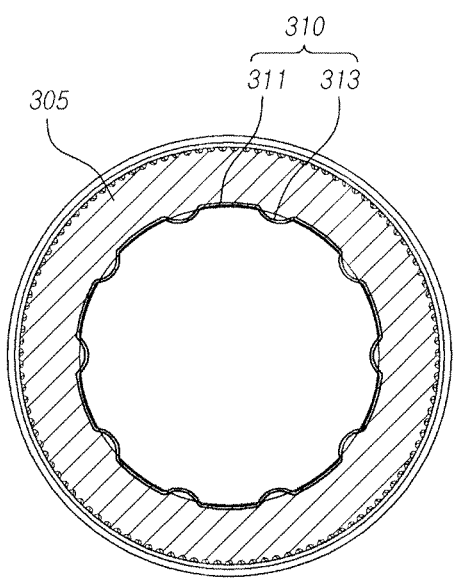

FIG. 3 is an exploded perspective view illustrating a part of a belt driveline according to a first embodiment of the present invention, FIGS. 4 and 5 are front views illustrating a nut pulley in a belt driveline according to a first embodiment of the present invention, FIG. 6 is a illustrating a coup state of a nut pulley and a ball nut in a belt driveline according to a first embodiment of the present invention, FIG. 7 is an exploded perspective view illustrating a part of a belt driveline according to a second embodiment of the present invention, FIGS. 8 and 9 are front views illustrating a nut pulley in a belt driveline according to a second embodiment of the present invention.

Figure 2:
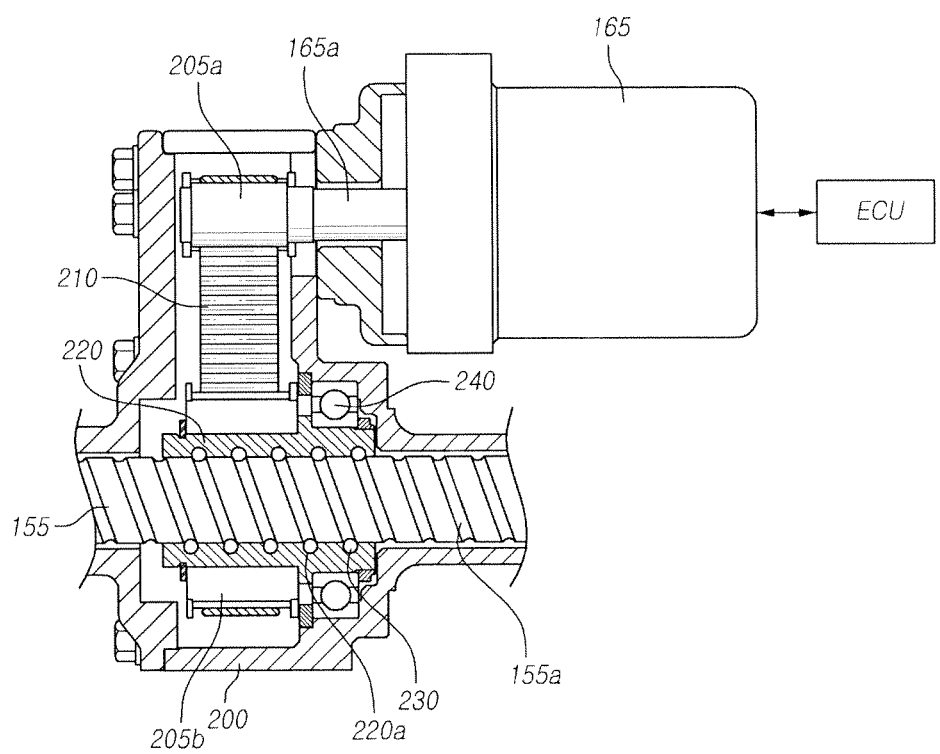
FIG. 2 is a cross-sectional view schematically illustrating a belt type driveline in the general rack assist type electric power steering apparatus.

Referring to FIGS. 3 to 9 together with FIGS. 1 and 2, a belt type driveline according to the present invention includes a ball nut 220 engaged with a rack bar 155 to make the rack bar 155 slide, a nut pulley 305 engaged with an outer peripheral surface of the ball nut 220 to transfer a driving force of a belt 210, and support members 310 provided in an inner peripheral surface of the nut pulley 305 and adding a supporting force while being elastically transformed in the engagement with the ball nut 220.

The belt type driveline includes a driving means and a driven means. The driving means includes a motor 165 controlled by the ECU, a motor pulley 205a coupled to a shaft 165a of the motor 165, the belt 210, etc.

Further, the driven means includes the ball nut 220 for supporting the rack bar 115 in the inside of a rack housing 200 surrounding the rack bar 155, and the nut pulley 305 is engaged with the outer peripheral surface of the ball nut 220.

The motor pulley 205a connected with the motor 165 and the nut pulley 305 connected with the rack bar 155 are disposed in parallel. The belt 210 is fitted to the motor pulley 205a and the nut pulley 305, so that a rotation force of the motor 165 is transferred to the rack bar 155 through the ball nut 220 and the rack bar 155 horizontally moves through an operation of the ball nut 220, thereby generating auxiliary steering power.

The ball out 220 rotates while being engaged with the rack bar 155 through the ball 230, to make the rack bar 155 slide in an inside of the rack housing 200 and a gear housing (not shown). The nut pulley 305 for rotating the ball nut 220 and a bearing 240 for supporting rotation of the ball nut 220 are provided in the outer peripheral surface of the ball nut 220.

A power transmission structure capable of generating auxiliary steering power by sliding the rack bar 155 in the shaft direction is provided in an inner peripheral surface of the ball nut 220 and the outer peripheral surface of the rack bar 155. The power transmission structure includes an outer peripheral screw groove 155a, which has a hemisphere-shaped or arc-shaped cross section and is formed in the outer peripheral surface of the rack bar 155 in a spiral shape, the ball 230 inserted in the outer peripheral screw groove 155a, and an groove 220a, which has a hemisphere-shaped or arc-shaped cross section and is formed in the inner peripheral surface of the ball nut 220 in a spiral shape, corresponding to the outer peripheral screw groove 155a.

The ball nut 220 is a hollow pipe provided with the inner peripheral screw groove 220a in the inner peripheral surface thereof. The nut pulley 305 is closely installed in one side of the outer peripheral surface of the ball nut 220, and the bearing 240 is installed in an opposite side of the outer peripheral surface of the ball nut 220. A lock screw (not shown) is screw-engaged with an inner peripheral surface of the rack housing 200, to be fixed to a distal end of an extrados and one end of the outer peripheral surface of the bearing 240 while supporting the bearing 240.

Further, the support members 310 provided in an inner peripheral surface of the nut pulley 305 add the supporting force while being elastically deformed when the nut pulley 305 is engaged with the ball nut 220, thereby absorbing vibration and noise while preventing the spinning with no traction of the rut pulley 305.

The support members 310 are implemented in the present invention according to a first embodiment of FIGS. 3 to 6 and a second embodiment of FIGS. 7 to 9.

First, the first embodiment of the present invent, illustrated in FIGS. 3 to 6 will be first described.

In the first embodiment, the support member 310 is formed of a metal material, a plastic material, a rubber material, or the like. As illustrated in FIG. 4, the plurality of support members 310 may be inserted in and engaged with the nut pulley 305 or may be integrally formed with the nut pulley 305 through an insert molding.

In this case, the support member 310 includes a protrusion 313c protruding in a radial direction, i.e. toward the inner center of the ball nut 220, and the nut pulley 305 includes a coupling recess 305a to which the support members 310 are coupled in the inner peripheral surface of the nut pulley 305.

Further, as illustrated in FIGS. 5 and 6, the support member 310 has a cylinder shape formed by bending a thin plate made of a metal material, a plastic material, or a rubber material, and is integrally formed with the nut pulley 305 by the insert molding. The support member 310 may generally include a fixed part 311 and an elastically transformable part 313.

The fixed part 311 is a fixed part inserted and integrally insert molded in the inside of the nut pulley 305 and supports elastic transform and restoration of the elastically transformable part 313.

The elastically transformable part 313 is a part protruding from the inner peripheral surface of the nut pulley 305, and adds the supporting force to the nut pulley 305 and the ball nut 220 while being elastically deformed in the engagement of the nut pulley 305 and the ball nut 220, thereby preventing the spinning with no traction of the nut pulley 305.

In the first embodiment illustrated in FIGS. 5 and 6, both side edges 313a of each of the elastically transformable parts 313 connected to the fixed parts 311 extend and protrude in the radial direction, are then bent in the circumferential direction, and are then connected to each other.

Further, the elastically transformable part 313 has a protrusion 313c formed at a region 313b at which the side edges 313a of the elastically transformable part 313 are connected to each other after being bent in the circumferential direction, wherein the protrusion 313c protrudes in the radial direction, i.e., toward the inner center of the ball nut 220.

Accordingly, when the nut pulley 305 is engaged with the outer peripheral side of the ball nut 220, the protrusion 313c of the elastically transformable part 313 is elastically transformed as illustrated in FIG. 6 and adds the supporting force to the ball nut 220 and the nut pulley 305 by an elastic restoration force, so that it is possible to absorb and damp vibration and noise generated in the nut pulley 305 and the ball nut 220 and vibration and noise transferred through the ball and the rack bar 155 in the rotation of the ball nut 220 while preventing the spinning with no traction of the ball nut 220 and the nut pulley 305.

Here, a depressed seating part 220b may be provided in the outer peripheral surface of the ball nut 220 by which the elastically transformable part 313 is supported.

A second embodiment illustrated in FIGS. 7 to 9 will be described.

In the second embodiment, the support member 310 is also formed of a metal material, a plastic material, a rubber material, etc. As illustrated in FIG. 8, the plurality of support members 310 may be individually inserted in the nut pulley 305 or may be integrally formed with the nut pulley 305 by the insert molding.

In this case, the support member 310 is formed to have a curved surface convex in the radial direction while protruding outward from the inner peripheral surface of the nut pulley 305. The nut pulley 305 includes coupling recesses 305a to which the support members 310 are coupled in the inner peripheral surface thereof.

Further, the support member 310 has a cylinder shape formed by bending a thin plate made of a metal material, plastic material, or a rubber material as illustrated in FIG. 9, and is integrally formed with the nut pulley 305 by the insert molding. The support member 310 may generally include the fixed part 311 and the elastically transformable part 313.

In this case, the elastically transformable part 313 is formed to have a curved surface convex in the radial direction while protruding outward from the inner peripheral surface of the nut pulley 305.

As described above, the elastically transformable part 313 is formed to have the curved surface convex in the radial direction, so that the elastically transformable part 313 adds the supporting force to the ball nut 220 and the nut pulley 305 while being elastically transformed like the protrusion 313c in the first embodiment, thereby absorbing and damping vibration and noise generated in the nut pulley 305 and the ball nut 220 and vibration and noise transferred through the ball and the rack bar 155 in the rotation of the ball nut 220 while simultaneously preventing the spinning with no traction of the ball nut 220 and the nut pulley 305.

According to the aforementioned first and second embodiments, the elastically transformable parts 313 may be disposed with a predetermined interval in the circumferential direction in the in per peripheral surface of the nut pulley 305, and the multiple elastically transformable parts 313 may also be disposed with a predetermined interval in the shaft direction.

The number of elastically transformable parts according to the aforementioned first and second embodiments may be determined according to the type of automobiles or a size of the auxiliary steering power demanded in the rack assist type electric power steering apparatus.

The belt type driveline according to the aforementioned first and second embodiments constitutes the rack assist type electric power steering apparatus together with the torque sensor for outputting the electrical signal proportionate to the steering torque, the ECU for generating the control signal based on the electrical signal transferred from the torque sensor, and the motor 165 for generating the auxiliary steering power based on the control signal transferred from the ECU.

Accordingly, the aforementioned present invention improves the power transmission efficiency and the durability by preventing the spinning with no traction of the ball nut and the nut pulley due to the slip between the ball nut and the nut pulley in the operation of the belt by the motor, and provides a driver with convenient steering by minimizing vibration and noise transferred through the rack bar, the ball nut, the nut pulley, etc., when the rack bar slides while the nut pulley and the ball nuts rotates.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present been described for illustrative those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A belt driveline comprising:
    a ball nut engaged with a rack bar and configured to slide the rack bar;
    a nut pulley engaged with an outer peripheral surface of the ball nut and configured to transfer a driving force of a belt; and
    a support member formed in an inner peripheral surface of the nut pulley and configured to add a supporting force while being elastically transformed when the nut pulley is engaged with the ball nut, wherein the support member includes:
    a fixed part embedded in and integrally fixed to an inner side of the nut pulley; and
    an elastically transformable part protruding outward from the fixed part at the inner peripheral surface of the nut pulley, wherein the elastically transformable part includes:
    side edges connected to the fixed part extending in a radial direction, portions of the side edges being curved in a circumferential direction, and connected to each other; and
    a radial protrusion being formed at a region at which the side edges of the elastically transformable part are connected to each other.

2. The belt driveline of claim 1, wherein the nut pulley includes coupling recesses to which the support members is embedded in the inner peripheral surface thereof.

3. The belt driveline of claim 1, wherein the support member is integrally formed with the nut pulley by molding.

4. The belt driveline according to claims 2 or 3, wherein the support member is formed to have a curved surface convex to the radial direction.

5. A rack assist electric power steering apparatus, comprising:
    a torque sensor for outputting an electrical signal proportionate to steering torque;
    an Electronic Control Unit (ECU) for generating a control signal based on the electrical signal transferred from the torque sensor;
    a motor for generating auxiliary steering power based the control signal transferred from the ECU; and
    a belt driveline for transferring auxiliary power generated in the motor to a rack bar,
    wherein the belt driveline comprises:
    a ball nut engaged with the rack bar and configured to slide the rack bar;
    a nut pulley engaged with an outer peripheral surface of the ball nut and configured to transfer a driving force of a belt; and
    a support member formed in an inner peripheral surface of the nut pulley and configured to add a supporting force while being elastically transformed when the nut pulley is engaged with the ball nut, wherein the support member includes:
    a fixed part embedded in and integrally fixed to an inner side of the nut pulley; and
    an elastically transformable part protruding outward from the fixed part at the inner peripheral surface of the nut pulley, wherein the elastically transformable part includes:
    side edges connected to the fixed part extending in a radial direction, portions of the side edges being curved in a circumferential direction, and connected to each other; and
    a radial protrusion being formed at a region at which the side edges of the elastically transformable part are connected to each other.

* * * * *